United States Patent
Chen et al.

(10) Patent No.: US 12,228,657 B2
(45) Date of Patent: Feb. 18, 2025

(54) REGION-ADAPTED NEURAL NETWORK FOR LOCATION DETERMINATION

(71) Applicant: MediaTek Inc., Hsinchu (TW)

(72) Inventors: Po-Yu Chen, Hsinchu (TW); Hao Chen, Hsinchu (TW); Tsung-Yu Chiou, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 346 days.

(21) Appl. No.: 17/851,924

(22) Filed: Jun. 28, 2022

(65) Prior Publication Data

US 2023/0057518 A1   Feb. 23, 2023

Related U.S. Application Data (60) Provisional application No. 63/235,213, filed on Aug. 20, 2021.

(51) Int. Cl.
*G01S 19/25* (2010.01)
*H04B 7/185* (2006.01)
*H04W 4/029* (2018.01)

(52) U.S. Cl.
CPC .......... *G01S 19/25* (2013.01); *H04B 7/18556* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 6,351,711 B1* | 2/2002 | Chansarkar | G01S 19/42 701/481 |
| 2018/0180742 A1* | 6/2018 | Capet | G01S 19/36 |
| 2020/0049831 A1* | 2/2020 | Bomart | G01S 19/20 |
| 2020/0049837 A1* | 2/2020 | Werner | G06N 20/20 |
| 2020/0233096 A1* | 7/2020 | Hazlett | H04W 4/02 |
| 2021/0312632 A1* | 10/2021 | Ma | G06V 10/267 |
| 2021/0341625 A1* | 11/2021 | Gupta | G01S 19/07 |
| 2021/0342586 A1* | 11/2021 | Fleisig | G06V 10/457 |
| 2021/0342669 A1* | 11/2021 | Godwin, IV | G06N 3/045 |

FOREIGN PATENT DOCUMENTS

| | | |
|---|---|---|
| CN | 111665533 A | 9/2020 |
| CN | 112902989 A | 6/2021 |

\* cited by examiner

*Primary Examiner* — Kenneth B Wells
(74) *Attorney, Agent, or Firm* — Tong J. Lee (57) ABSTRACT

A wireless device includes a satellite receiver to receive data from multiple satellites. The wireless device also includes processing circuitry and memory. The memory stores one or more neural network models. The processing circuitry is operative to identify a neural network model that has been trained to adapt to a region in which the wireless device operates, classify satellite raw measurements from each satellite at a given time into a corresponding quality level using the neural network model, and identify satellite raw measurements with a quality level higher than a threshold. The location of the wireless device is calculated using the identified satellite raw measurements.

20 Claims, 5 Drawing Sheets

REGION-ADAPTED NEURAL NETWORK FOR LOCATION DETERMINATION

CROSS-REFERENCE TO RELATED APPLICATIONS

This application claims the benefit of U.S. Provisional Application No. 63/235,213 filed on Aug. 20, 2021, the entirety of which is incorporated by reference herein.

TECHNICAL FIELD

Embodiments of the invention relate to a positioning method using satellite raw measurements and more specifically, to a wireless device that uses a neural network to improve location determination.

BACKGROUND

Using satellite data to determine a wireless device's location can be extremely complicated in urban areas. One of the major interferences to satellite signals is multipath propagation, where satellite signals are reflected, refracted, and/or absorbed by buildings, foliage, etc. along the signal transmission path. Such a phenomenon results in multiple paths of arrival for a satellite signal. Moreover, the transmission conditions can vary across different cities.

Most of the traditional designs use a Kalman filter in a satellite positioning receiver. The filter performs smoothing, estimating, and predicting to minimize a least-square error. More specifically, the objective of the filter is to minimize the sum of squared residuals (which is the difference between a measured value and the fitted value provided by a model). With the assumption of a Linear Time-Invariant (LTI) system with Gaussian noises, the result obtained from the Kalman filter can be considered as an optimized one. However, when performing the positioning for urban scenarios, a major challenge is to continuously adjust the Kalman filter parameters to adapt to the environment of operation.

Therefore, there is a need for improving the traditional satellite-based positioning methods.

SUMMARY

In one embodiment, a method is provided for determining a location of a wireless device that receives data from multiple satellites. The method comprises the steps of identifying a neural network model that has been trained to adapt to a region in which the wireless device operates, classifying satellite raw measurements from each satellite at a given time into a corresponding quality level using the neural network model, and identifying satellite raw measurements with a quality level higher than a threshold. The location of the wireless device is calculated using the identified satellite raw measurements.

In one embodiment, a wireless system comprises a satellite receiver to receive data from multiple satellites. The wireless device also comprises processing circuitry and memory. The memory stores one or more neural network models. The processing circuitry is operative to identify a neural network model that has been trained to adapt to a region in which the wireless device operates, classify satellite raw measurements from each satellite at a given time into a corresponding quality level using the neural network model, and identify satellite raw measurements with a quality level higher than a threshold. The processing circuitry is operative to calculate the location of the wireless device using the identified satellite raw measurements.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention improve location determination using satellite raw measurements classified by a region-adapted neural network. The region-adapted neural network is trained to adapt to diverse geographical regions, such as dense urban areas and urban canyons. A machine-learning based method incorporates the neural network to solve the problems of severe multipath errors in urban scenarios. Combining the region-adapted neural network and a Kalman filter based algorithm can improve the accuracy of location determination.

The region-adapted neural network is a learning-based model that learns to classify satellite raw measurements for each satellite and at each time stamp at a region of interest. A wireless device obtains satellite raw measurements from those satellites that are available to the device and/or tracked by the device. The satellite raw measurements are classified into two or more classes of different quality levels. A region-adapted neural network model may be trained at a corresponding region for an extended period of time (e.g., 12 hours or more). The trained model (including weights) can be pre-loaded or downloaded to a wireless device to perform real-time location determination.

As used herein, the term "satellite raw measurements" includes a device receiver's observation data, broadcast orbit information from satellites, and supporting data, such as meteorological parameters collected from co-located instruments. For example, satellite raw measurements may include a satellite system identifier, signal-to-noise ratio (SNR) or another signal vs. noise metric calculated by the device, Doppler information, Elevation, Azimuth, clock information, etc. The satellites may be part of a constellation in the Global Navigation Satellite System (GNSS) such as the United States Global Positioning System (GPS), Russia's Global Navigation Satellite System (GLONASS), China's BeiDou Navigation Satellite System (BDS), the European Union's Galileo, etc. In the disclosure, the terms "location" and "position" are used interchangeably.

A wireless device may compute pseudo-ranges from satellite raw measurements of multiple satellites, and determine its location from the pseudo-ranges. The pseudo-range between a receiver and a satellite is calculated by multiplying the speed of light with the difference between the time of reception (expressed in the time frame of the receiver) and the time of transmission (expressed in the time frame of the satellite) of a satellite signal. This pseudo-range corresponds to the distance from the receiver to the satellite, including receiver and satellite clock offsets and other biases and errors, such as ionospheric delay error, tropospheric delay error, and multipath propagation error. In general, a device can determine its location from the pseudo-ranges of four or more satellites. Due to the large number of satellites currently deployed in space, a device may be able to simultaneously receive satellite signals from more than four satellites (e.g., ten or more satellites).

Figure 1:
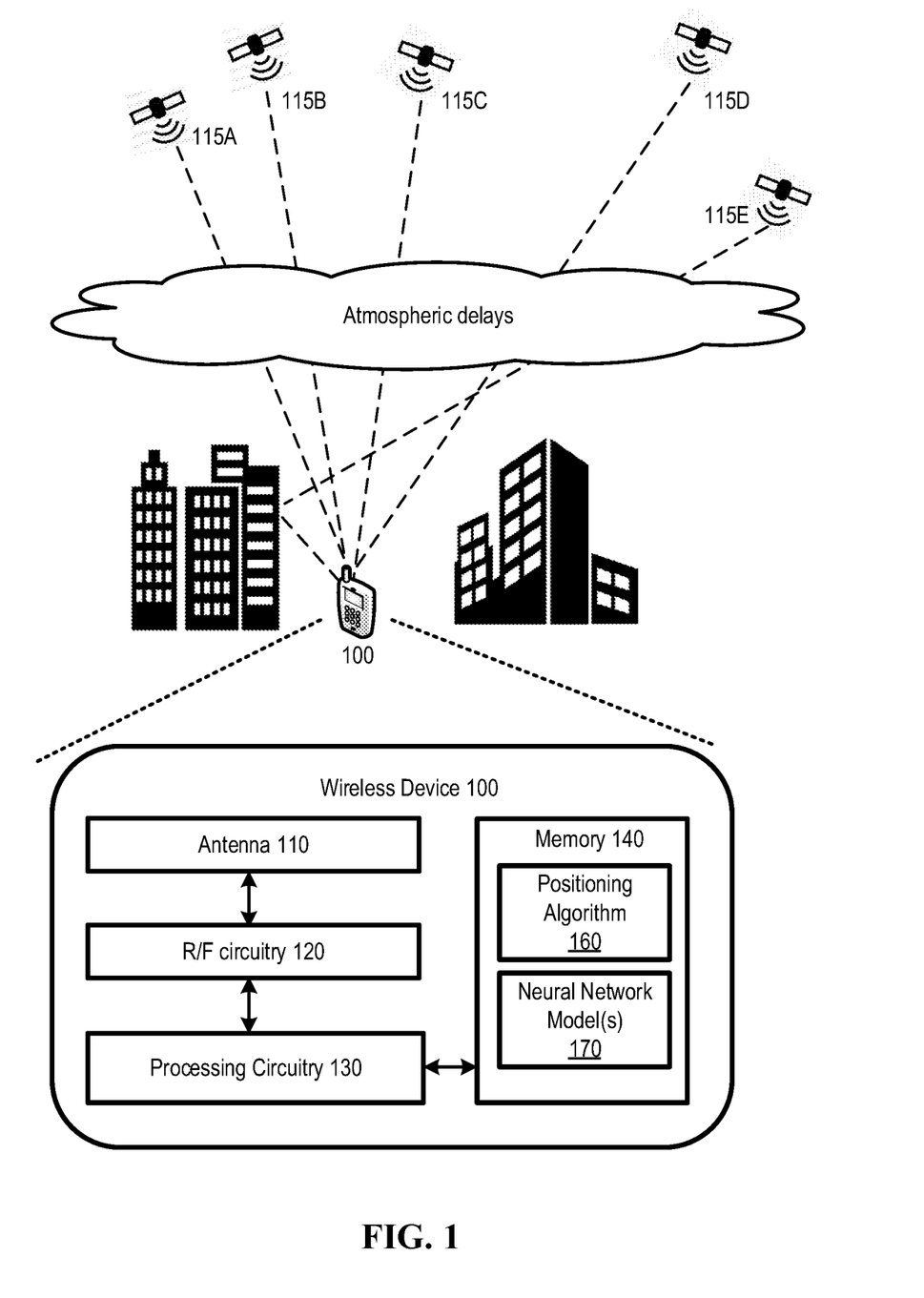
FIG. 1 is a diagram illustrating an environment in which a wireless device with a region-adapted neural network may operate according to one embodiment.

FIG. 1 is a diagram illustrating an environment in which a wireless device 100 with a region-adapted neural network may operate according to one embodiment. In this example, the wireless device 100 receives satellite signals from multiple satellites, five of which are shown as satellites 115A-115E (collectively referred to as satellites 115). The received satellite signals include errors caused by atmospheric delays such as ionospheric delay and tropospheric delay. Additionally, the received satellite signals may also include a multipath propagation error such as the signal received from satellite 115E.

FIG. 1 also shows that the wireless device 100 includes an antenna 110 coupled to radio-frequency (RF) circuitry 120, which further includes a satellite receiver configured to receive satellite signals. The wireless device 100 also includes processing circuitry 130, which may further include one or more programmable processors (e.g., a central processing unit (CPU), a digital signal processor (DSP), a graphics processing unit (GPU), an accelerated processing unit (APU), a neural processing unit (NPU), etc.). The processing circuitry 130 may also include special-purpose circuits such as application-specific integrated circuits (ASICs). The processing circuitry 130 is coupled to a memory 140. The memory 140 may include memory devices such as dynamic random access memory (DRAM), static RAM (SRAM), and/or other volatile and non-volatile memory. It is understood the embodiment of FIG. 1 is simplified for illustration purposes. Additional hardware components may be included.

In one embodiment, the memory 140 may store a positioning algorithm 160 and one or more neural network models 170. In one embodiment, the neural network model 170 is a region-adapted neural network model, which contains weights that have been trained with satellite data collected in a region of interest (e.g., where the wireless device 100 is located). In one embodiment, the neural network model 170 may be implemented by a multilayer perceptron network. The positioning algorithm 160 may be based on a known algorithm such as the Kalman filter algorithm. Additionally or alternatively, the positioning algorithm 160 may include at least one of: a least square algorithm, a weighted least square algorithm, and a closed-form algorithm. The neural network model 170 and the positioning algorithm 160 may be executed by the processing circuitry 130.

Figure 2:
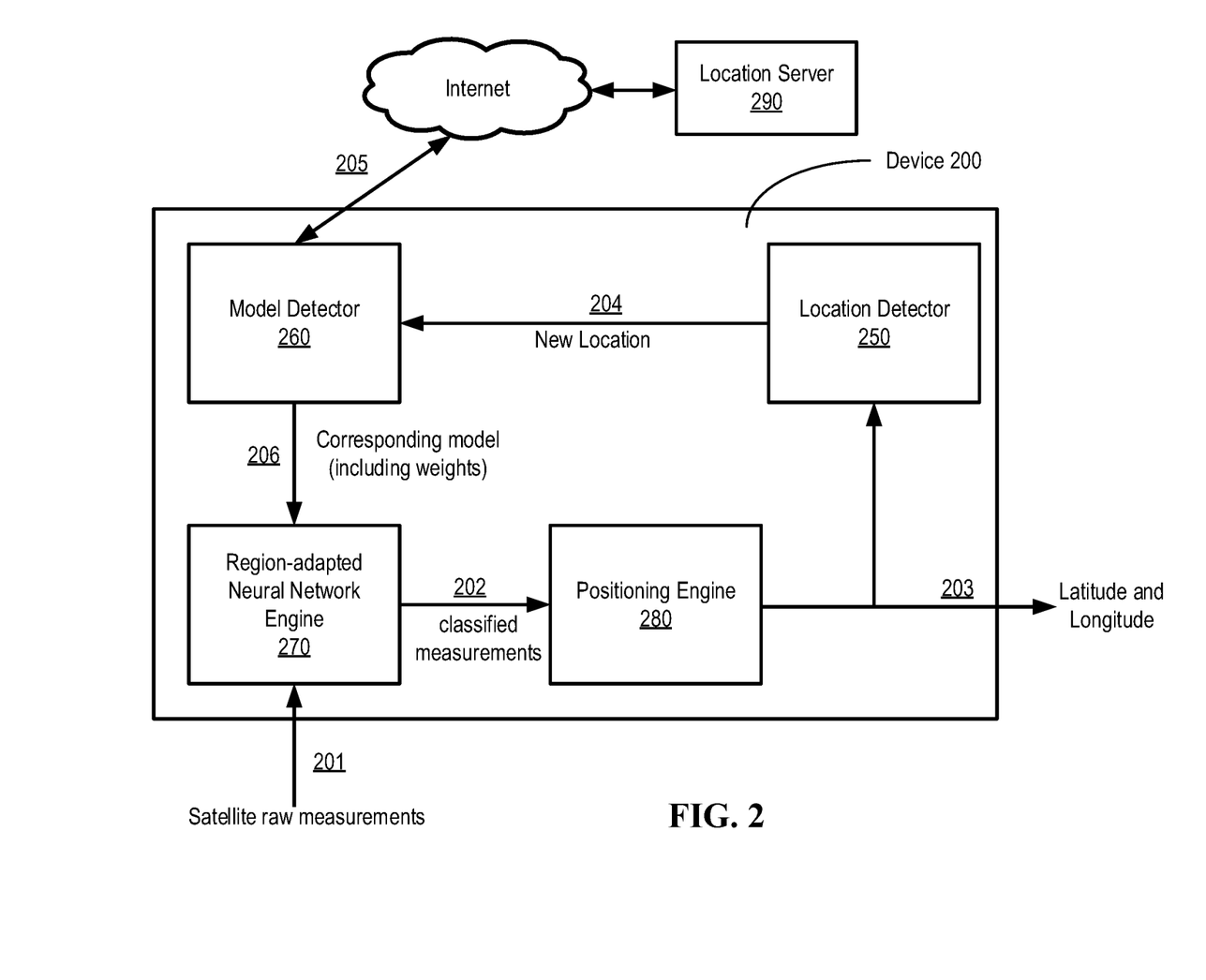
FIG. 2 is a diagram illustrating an overview of a location determination device and method according to one embodiment.

FIG. 2 is a diagram illustrating an overview of a location determination device and method according to one embodiment. The location determination method is performed by a device 200, which may be an example of the wireless device 100 in FIG. 1. The device 200 includes a location detector 250, a model detector 260, a region-adapted neural network model 270, and a positioning engine 280. The region-adapted neural network model 270 is stored in a memory, and has been trained for the region in which the device 200 operates. The location detector 250, the model detector 260, and the positioning engine 280 may be implemented by hardware circuits, software, or a combination of hardware and software.

At step 210, the device 200 obtains satellite raw measurements for each of the tracked satellites at a given time. At step 220, the device 200 executes the region-adapted neural network model 270 to classify the satellite raw measurements into two or more quality levels. Each satellite's raw measurements are classified into a corresponding quality level. The device 200 may discard, disregard, or ignore the measurements with a quality level below a threshold, e.g., measurements with the lowest quality level. At step 203, the measurements with a quality level exceeding the threshold are processed by the positioning engine 280 to output the position of the device, e.g., latitude and longitude. The positioning engine 280 may execute the positioning algorithm 160 in FIG. 1 to compute the location of the device 200.

The location detector 250 monitors the output from the positioning engine 280 and detects any changes in device location. When a new device location is detected, at step 204 the model detector 260 determines whether the stored region-adapted neural network model 270 needs an update, e.g., when the coverage of the model 270 is no longer applicable to the new location and the model adapted to the new location is not stored in the device 200. If an update is needed, the model detector 260 at step 205 requests a location server 290 over a wireless network (e.g., the Internet) to download a new neural network model adapted to the new location of the device 200. After the model detector 260 receives the downloaded neural network model corresponding to the new location, it updates the stored region-adapted neural network model 270 with the downloaded model. The downloaded model includes weights that have been trained using the training data collected at the new location or in a region encompassing the new location.

In some embodiments, the device 200 may store multiple region-adapted neural network models in the memory, e.g., N neural networks for N cities, respectively. The N neural networks may each have a different type of multipath propagation characteristic and/or a different type of atmospheric characteristic. The device 200 first estimates its location, e.g., in which city it is located, and then selects one of the stored neural network models for that city (e.g., the neural network model 270). After selecting the neural network model 270, the device 200 can start location determination by executing the aforementioned steps 201-203 or steps 201-206.

In one embodiment, the neural network model 270 may be trained and used for positioning in an indoor environment. The device 200 may combine the satellite raw measurements with data from other wireless systems to perform location determination. For example, other wireless systems may include a cellular network, a Wi-Fi network, a Bluetooth network, etc. The data from the other wireless systems may include cell ID, signal strength from a base station or an access point of the other wireless systems, channel state information, etc. In one embodiment, the device 200 may receive terrain or building information from a data collection system. The terrain or building information can be used by the device to estimate multipath effects on satellite signals and to estimate the quality level of satellite raw measurements from a given satellite at a given time. For example, if the building information indicates that a given satellite at a given time is blocked by a building, then the device 200 may disregard the data obtained from the given satellite at that given time based on this building information. In one embodiment, the building information may be incorporated into the neural network model 270 during the training phase. Thus, the device 200 may classify the satellite raw measurements based, at least in part, on the building information. Additionally or alternatively, the building information may be applied to the classified satellite raw measurements (i.e., at the output of the neural network model 270) as part of the positioning engine's 280 operation. For example, the positioning engine 280 may set Kalman filter weights based, at least in part, on the building information such that satellite raw measurements which suffer from multipath effects are given lower weights in the Kalman filter. Thus, the device 200 may calculate its location using the satellite raw measurements that are classified by the neural network model 270 as having a high quality level as well as the building information incorporated into the Kalman filter.

In one embodiment, the device 200 may receive pre-loaded neural network models before device shipment. In one embodiment, the pre-loaded neural network models may receive no updates during the device lifetime, or may receive model updates throughout the device lifetime. The model updates may be periodic and may be independent of the device's location, or may occur when the device changes its location.

Figure 3:
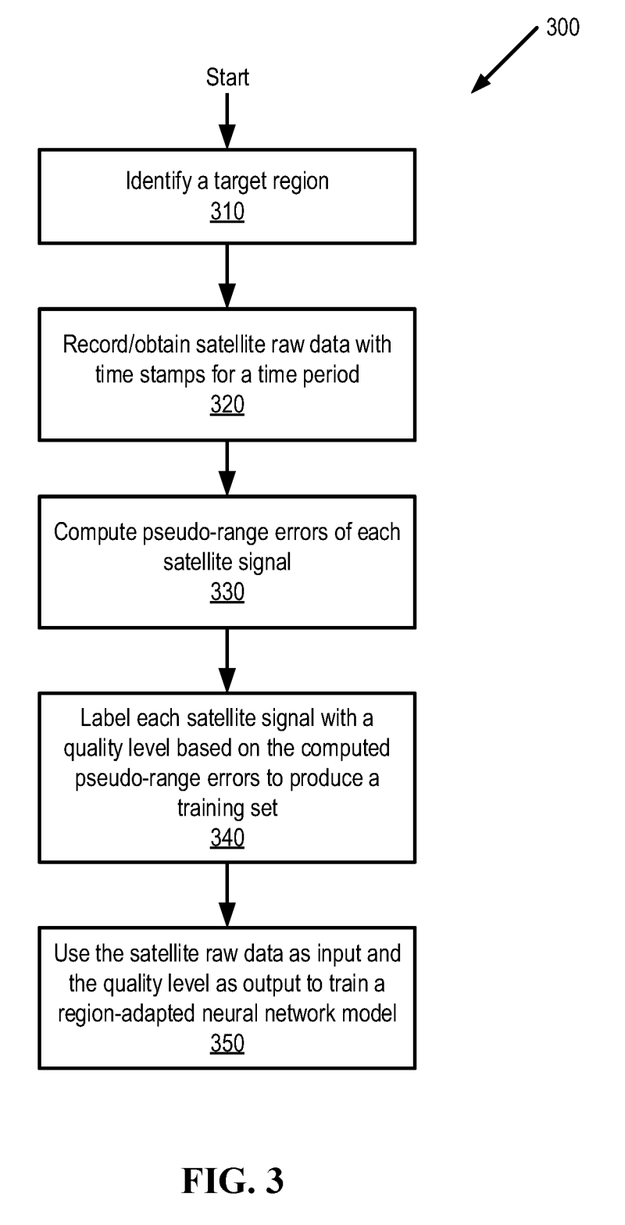
FIG. 3 is a flow diagram illustrating a method for training a region-adapted neural network model according to one embodiment.

FIG. 3 is a flow diagram illustrating a method 300 for training a region-adapted neural network model according to one embodiment. The method 300 may be performed by a computing and/or communication system including a satellite receiver. At step 310, the system identifies a target region for which the neural network is to be trained. The system is located in the target region to collect training data. Moreover, the pseudo-range between the system and each tracked satellite at each data collection epoch (i.e., time instant) is known. The target region may be a geographic region described by a center point (in longitude and latitude) and a diameter. The target region may be characterized by its location type, such as a dense urban area, an urban canyon, a dense foliage area, etc. At step 320, the system collects and records satellite raw measurements with time stamps for an extended time period (e.g., at least 12 hours) for each satellite tracked by the system.

The system at step 330 computes a pseudo-range for each tracked satellite using the time stamps and the satellite clock time in the satellite raw measurements, and calculates a pseudo-range error including at least a multipath propagation error from the satellite raw measurements of a given satellite at a given time. The pseudo-range error is the difference between the known pseudo-range and the corresponding computed pseudo-range for the given satellite with a given time stamp. The difference is compared with one or more predetermined thresholds to determine the quality level of the satellite raw measurements of the given satellite. For example, if the difference is 10 meters and the threshold is 30 meters, the satellite raw measurements of the given satellite are classified as good quality. If the difference exceeds 30 meters, the satellite raw measurements of the given satellite are classified as poor quality and may be disregarded. In a scenario where there are more than two quality levels, multiple thresholds may be predetermined to classify the satellite raw measurements into multiple quality levels.

At step 340, the system labels each set of satellite raw measurements (for a satellite and a time stamp) with a quality level based on the pseudo-range error to produce a training set. At step 350, the system uses the satellite raw data as input and the quality level as output to train a region-adapted neural network model for the target region. The trained neural network model may be downloaded to a wireless device (e.g., the device 100 in FIG. 1 or the device 200 in FIG. 2) for location determination.

In one embodiment, a first system may perform the data collection steps 310 and 320, and a second system may perform the training steps 330-350. For example, the first system may collect and record satellite raw measurements and provide these measurements to the second system to perform the training.

Figure 4:
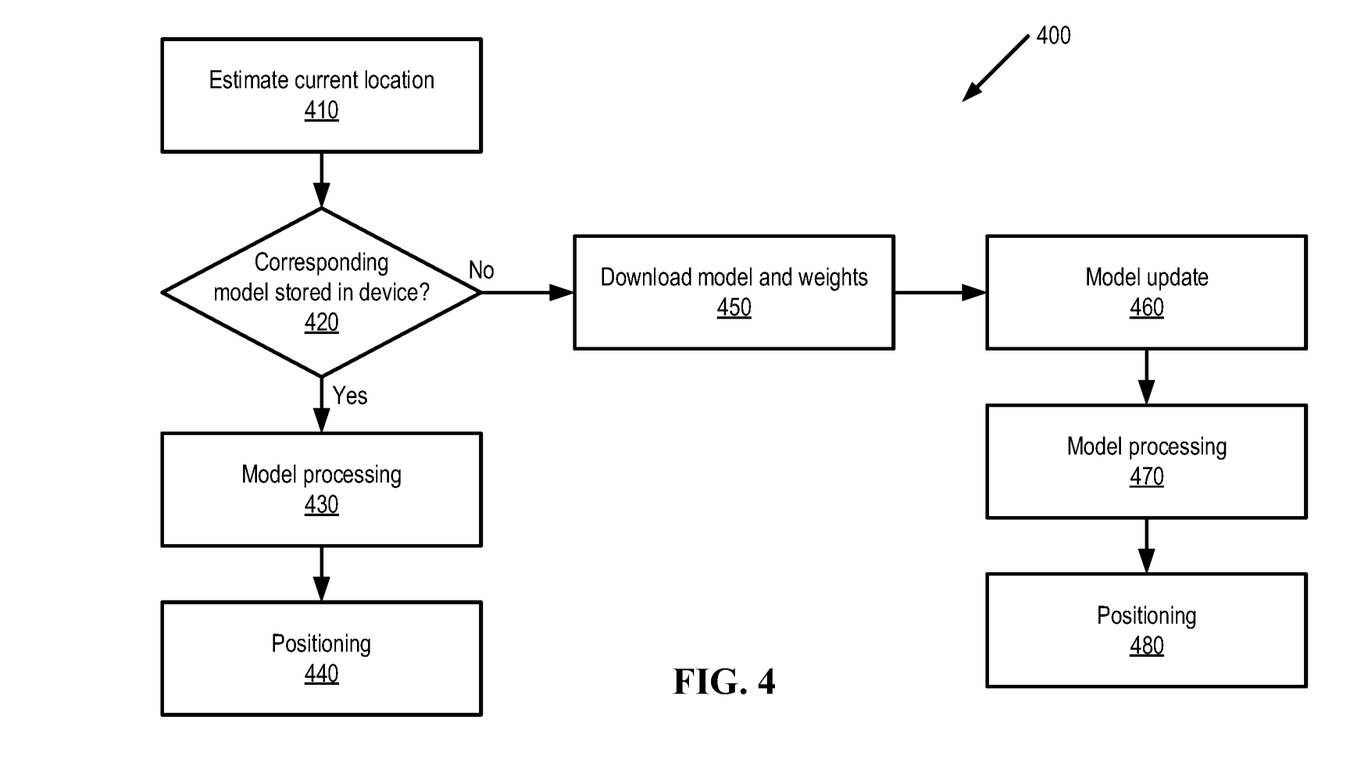
FIG. 4 is a flow diagram illustrating a method for model updates according to one embodiment.

FIG. 4 is a flow diagram illustrating a method 400 for model updates according to one embodiment. At step 410, the device estimates the current location. The estimation may be based on the Kalman filter positioning without the benefit of a neural network. Alternatively, the estimation may be based on information from the user (e.g., in which city the user is located) or from another wireless system (e.g., a cellular system). At step 420, the device determines whether the neural network model corresponding to the estimated location is stored in the device memory. If the corresponding neural network model is stored in the device, the device at step 430 processes the satellite raw measurements using the stored model, e.g., by classifying the satellite raw measurements into two or more classes of quality levels. At step 440, the device proceeds to determine its current location using the satellite raw measurements that are classified as having a high quality level (e.g., exceeding a quality level threshold).

If the corresponding neural network model is not stored in the device, the device at step 450 downloads the model, including the weights of the model, e.g., from a cloud server. At step 460, the device performs a model update, e.g., by replacing the stored model with the downloaded model. At step 470, the device processes the satellite raw measurements using the downloaded model, e.g., by classifying the satellite raw measurements into two or more classes of quality levels. At step 480, the device proceeds to determine its current location using the satellite raw measurements that are classified as having a high quality level (e.g., exceeding a quality level threshold).

Figure 5:
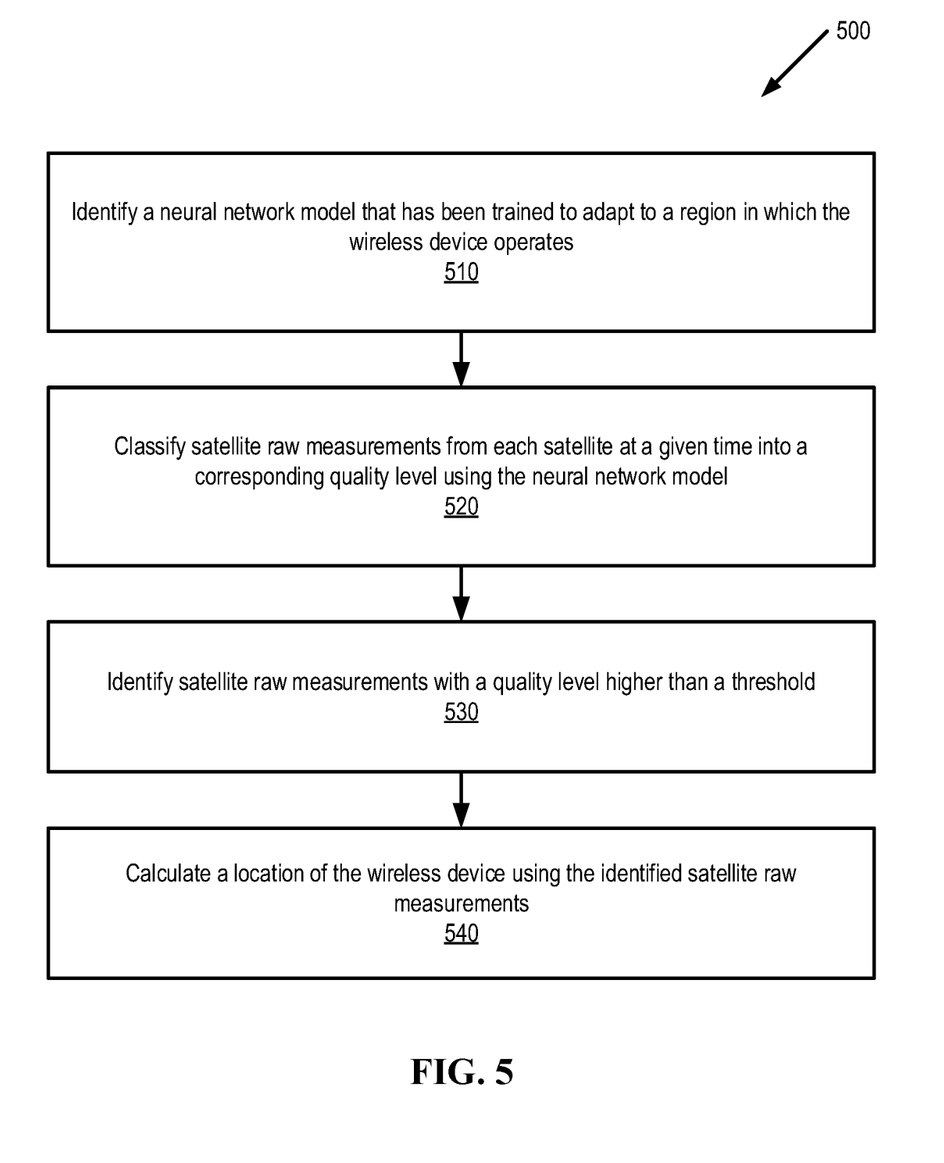
FIG. 5 is a flow diagram illustrating a method for location determination according to one embodiment.

FIG. 5 is a flow diagram illustrating a method 500 for location determination according to one embodiment. A device at step 510 identifies a neural network model that has been trained to adapt to a region in which the wireless device operates. The device at step 520 classifies satellite raw measurements from each satellite at a given time into a corresponding quality level using the neural network model. The device at step 530 identifies satellite raw measurements with a quality level higher than a threshold. The device at step 540 calculates the location of the wireless device using the identified satellite raw measurements.

In one embodiment, the neural network model has been trained to classify the satellite raw measurements according to a pseudo-range error computed during a training phase, the pseudo-range error including at least a multipath propagation error. The neural network model may be a multi-layer perceptron network. The satellite raw measurements may include some or all of the following satellite raw measurement items: a satellite system identifier, SNR, Doppler information, Elevation, Azimuth, and clock information. The neural network model may include input nodes at an input layer, each input node receiving a respective one of the satellite raw measurement items.

In one embodiment, the device may disregard the satellite raw measurements having the quality level lower than the threshold. The device may estimate its location to determine whether the neural network model stored in a device memory corresponds to the estimated location. The device may download from a server a new neural network model that corresponds to the estimated location when the neural network model stored in the device memory does not correspond to the estimated location.

In one embodiment, when classifying the satellite raw measurements, the device may incorporate building information to estimate multipath effects on signals from a given satellite at a given time, and classify the satellite raw measurements based, at least in part, on the building information. In another embodiment, when calculating the location of the wireless device, the device may incorporate building information to estimate multipath effects on signals from a given satellite at a given time, and calculate the location of the wireless device using the identified satellite raw measurements and the building information. The identified satellite raw measurements are those classified as having a high quality level. Moreover, when calculating the location of the wireless device, the device may incorporate information from one or more additional wireless systems in the calculation of the location of the wireless device, the one or more additional wireless systems include one or more of: a cellular system, a Wi-Fi system, and a Bluetooth system.

In an experiment, a 5-layer multilayer-perceptron with 46 thousand neurons is used as the neural network model to classify the quality of satellite raw measurements. The quality classification can be used to weigh the satellite raw measurements. The satellite raw measurements are refined based on the weights and serve as the inputs to a Kalman filter. The complexity of the neural network is kept small enough to fit into a mobile device having memory and computation constraints. With the use of an accelerator to accelerate neural network execution, the location determination performance can reach 4.5 milliseconds and 2.7 megabytes of memory access for typical urban cases with 15 available satellites, which fulfills real-time requirements for a positioning system. Moreover, the evaluation of the experiment shows significant positioning accuracy improvement compared to a standard Kalman filter in urban areas. Thus, by integrating a region-adapted neural network with a positioning algorithm such as a Kalman filter based method, the disclosed location determination method is shown to mitigate the effect caused by corrupted measurements such as multipath errors and atmospheric errors in challenging urban areas.

The operations of the flow diagrams of FIGS. 3-5 have been described with reference to the exemplary embodiments of FIGS. 1 and 2. However, it should be understood that the operations of the flow diagrams of FIGS. 3-5 can be performed by embodiments of the invention other than the embodiments of FIGS. 1 and 2, and the embodiments of FIGS. 1 and 2 can perform operations different than those discussed with reference to the flow diagrams. While the flow diagrams of FIGS. 3-5 show a particular order of operations performed by certain embodiments of the invention, it should be understood that such order is exemplary (e.g., alternative embodiments may perform the operations in a different order, combine certain operations, overlap certain operations, etc.).

Various functional components, blocks, or modules have been described herein. As will be appreciated by persons skilled in the art, the functional blocks or modules may be implemented through circuits (either dedicated circuits or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for determining a location of a wireless device that receives data from a plurality of satellites, comprising:
   selecting, from a plurality of neural network models adapting to respective regions, a neural network model that has been trained to adapt to a region encompassing the location of the wireless device;
   classifying, by using the neural network model, satellite raw measurements from each satellite at a given time into a corresponding quality level; and
   calculating the location of the wireless device using the satellite raw measurements that are classified as having a quality level higher than a threshold.

2. The method of claim 1, wherein the neural network model has been trained to classify the satellite raw measurements according to a pseudo-range error computed during a training phase, the pseudo-range error including at least a multipath propagation error.

3. The method of claim 1, wherein the neural network model is a multi-layer perceptron network.

4. The method of claim 1, wherein the satellite raw measurements include some or all of satellite raw measurement items: a satellite system identifier, signal-to-noise ratio (SNR), Doppler information, Elevation, Azimuth, and clock information.

5. The method of claim 4, wherein the neural network model includes a plurality of input nodes at an input layer, each input node receiving a respective one of the satellite raw measurement items.

6. The method of claim 1, further comprising:
   disregarding the satellite raw measurements having the quality level lower than the threshold.

7. The method of claim 1, further comprising:
   estimating the location of the wireless device to determine whether the neural network model stored in a device memory corresponds to the estimated location; and downloading, from a server, a new neural network model that corresponds to the estimated location when the neural network model stored in the device memory does not correspond to the estimated location.

8. The method of claim 1, further comprising:
incorporating building information to estimate multipath effects on signals from a given satellite at a given time; and
classifying the satellite raw measurements based, at least in part, on the building information.

9. The method of claim 1, further comprising:
incorporating building information to estimate multipath effects on signals from a given satellite at a given time; and
calculating the location of the wireless device using the identified satellite raw measurements and the building information.

10. The method of claim 1, further comprising:
incorporating information from one or more additional wireless systems in the calculation of the location of the wireless device, the one or more additional wireless systems include one or more of: a cellular system, a Wi-Fi system, and a Bluetooth system.

11. A wireless device, comprising:
a satellite receiver operative to receive data from a plurality of satellites;
processing circuitry; and
memory to store a plurality of neural network models adapting to respective regions, wherein the processing circuitry is operative to:
 select, from the plurality of neural network models, a neural network model that has been trained to adapt to a region encompassing the location of the wireless device;
 classify, by using the neural network model, satellite raw measurements from each satellite at a given time into a corresponding quality level using the neural network model; and
 calculate the location of the wireless device using the satellite raw measurements that are classified as having a quality level higher than a threshold.

12. The wireless device of claim 11, wherein the neural network model has been trained to classify the satellite raw measurements according to a pseudo-range error computed during a training phase, the pseudo-range error including at least a multipath propagation error.

13. The wireless device of claim 11, wherein the neural network model is a multi-layer perceptron network.

14. The wireless device of claim 11, wherein the satellite raw measurements include some or all of satellite raw measurement items: a satellite system identifier, signal-to-noise ratio (SNR), Doppler information, Elevation, Azimuth, and clock information.

15. The wireless device of claim 14, wherein the neural network model includes a plurality of input nodes at an input layer, each input node receiving a respective one of the satellite raw measurement items.

16. The wireless device of claim 11, wherein when identifying the satellite raw measurements, the processing circuitry is further operative to:
disregard the satellite raw measurements having the quality level lower than the threshold.

17. The wireless device of claim 11, wherein the processing circuitry is further operative to:
estimate the location of the wireless device to determine whether the neural network model stored in the memory corresponds to the estimated location; and
download, from a server, a new neural network model that corresponds to the estimated location when the neural network model stored in the memory does not correspond to the estimated location.

18. The wireless device of claim 11, wherein when classifying the satellite raw measurements, the processing circuitry is further operative to:
incorporate building information to estimate multipath effects on signals from a given satellite at a given time; and
classify the satellite raw measurements based, at least in part, on the building information.

19. The wireless device of claim 11, wherein when calculating the location of the wireless device, the processing circuitry is further operative to:
incorporate building information to estimate multipath effects on signals from a given satellite at a given time; and
calculate the location of the wireless device using the identified satellite raw measurements and the building information.

20. The wireless device of claim 11, wherein when calculating the location of the wireless device, the processing circuitry is further operative to:
incorporate information from one or more additional wireless systems in the calculation of the location of the wireless device, the one or more additional wireless systems include one or more of: a cellular system, a Wi-Fi system, and a Bluetooth system.

* * * * *